Dec. 8, 1964  P. JEAN-BAPTISTE ASTIER  3,160,742
COMPOSING COMPUTER AND INDICATOR
Filed Dec. 28, 1960  8 Sheets-Sheet 1
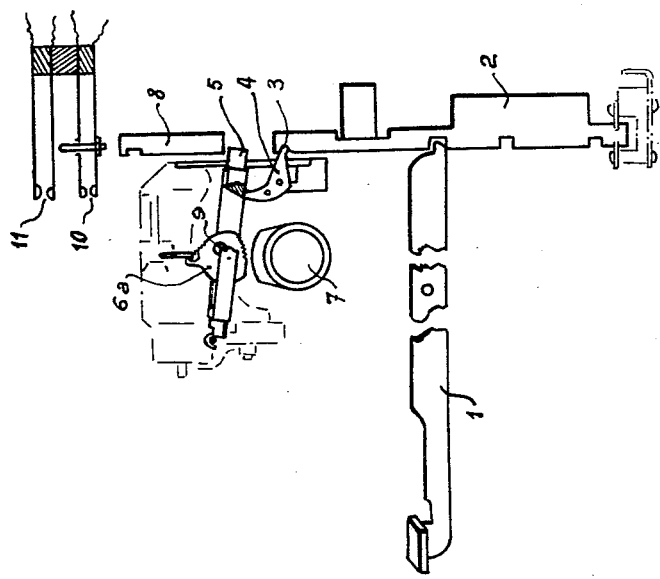
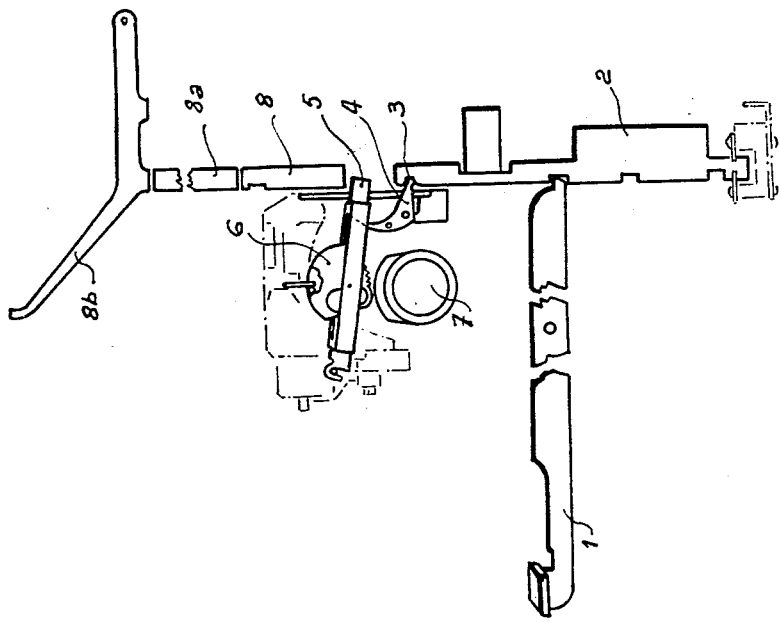
INVENTOR
Pierre Jean Baptiste Astier
BY  *Karl W. Flocks*
ATTORNEY

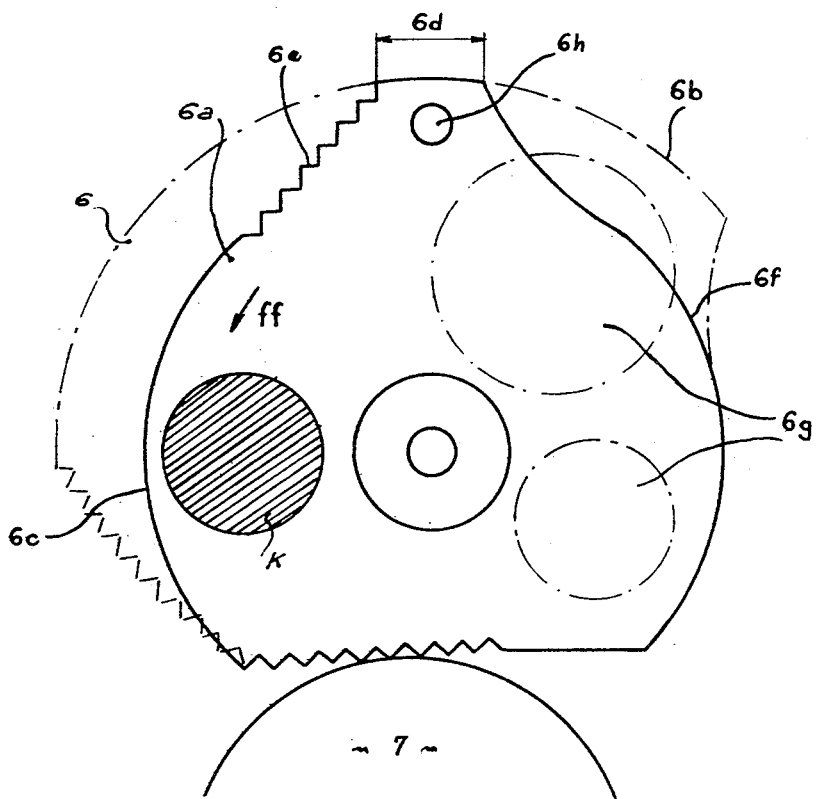

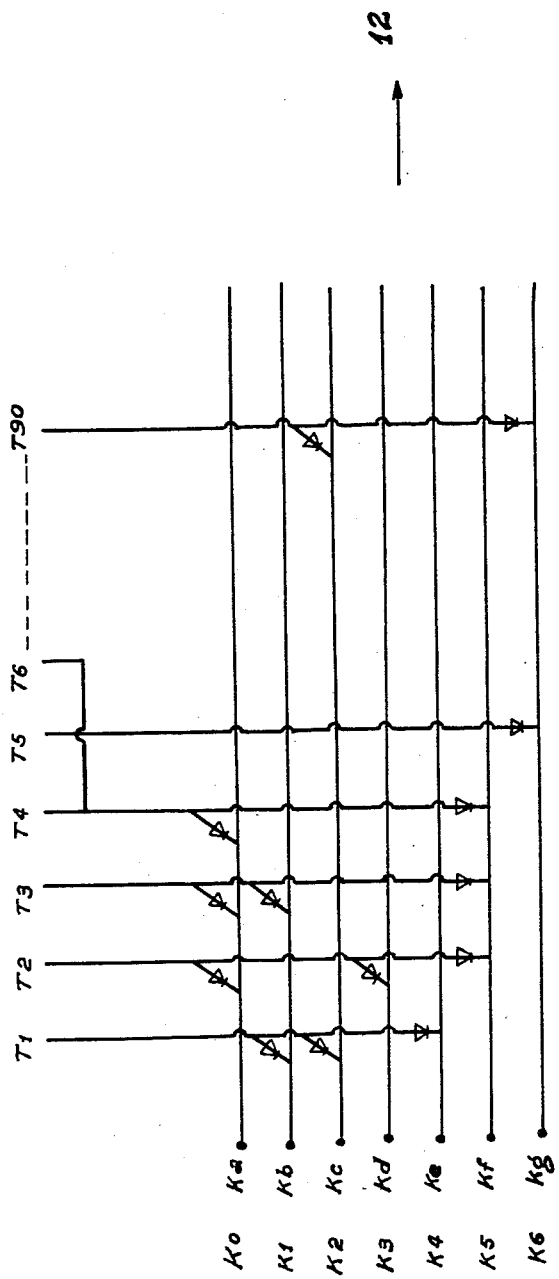

Dec. 8, 1964    P. JEAN-BAPTISTE ASTIER    3,160,742
COMPOSING COMPUTER AND INDICATOR
Filed Dec. 28, 1960    8 Sheets-Sheet 4

INVENTOR
Pierre Jean Baptiste Astier

BY *Karl W. Flocks*
ATTORNEY

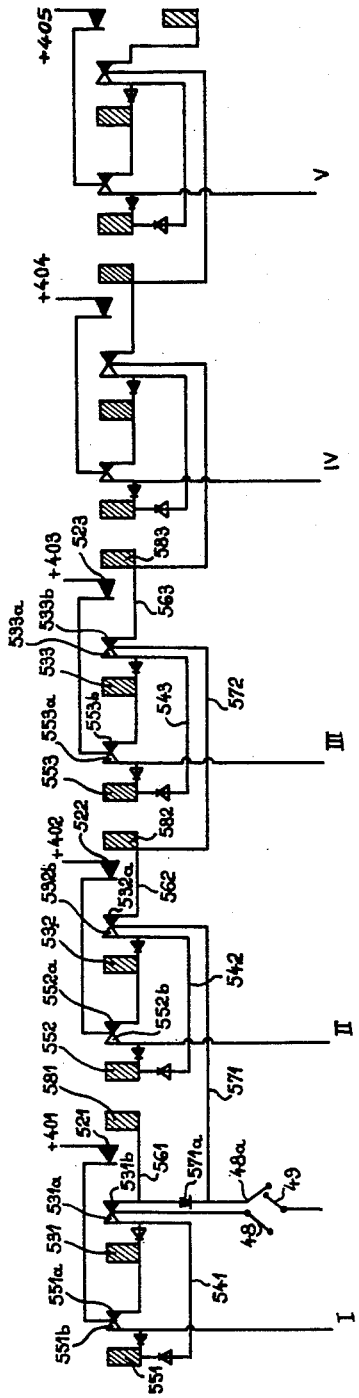
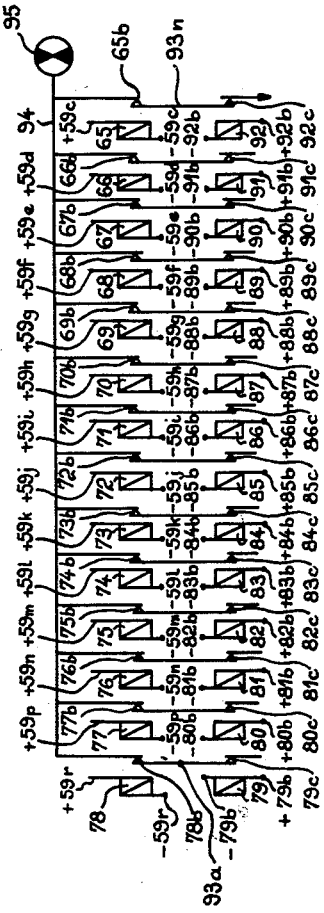
Fig. 7
Fig. 8

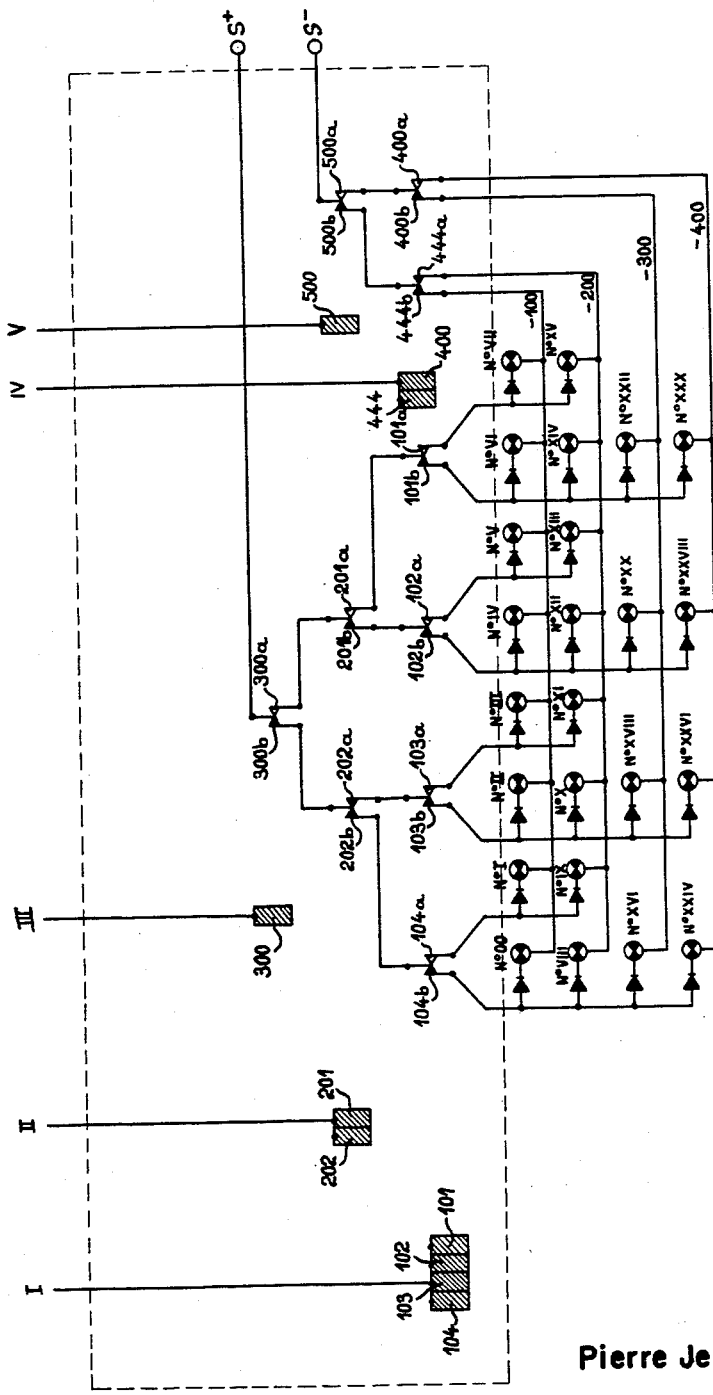

Dec. 8, 1964    P. JEAN-BAPTISTE ASTIER    3,160,742
COMPOSING COMPUTER AND INDICATOR
Filed Dec. 28, 1960    8 Sheets-Sheet 8
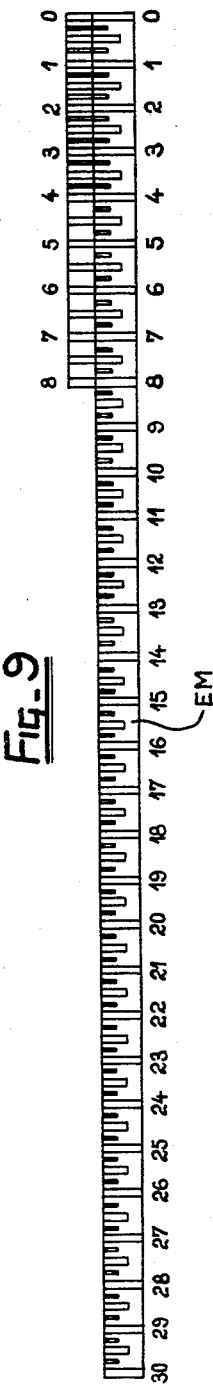
Fig_9
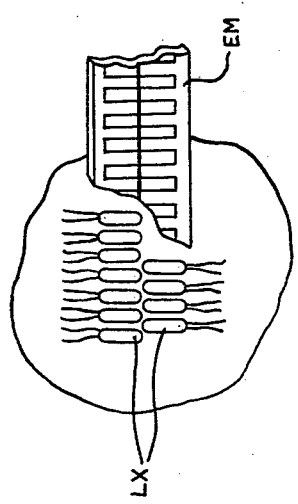
Fig_11
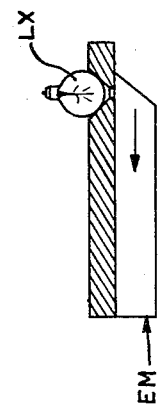
Fig_10
INVENTOR
Pierre Jean Baptiste Astier
BY  *Karl W. Flocks*
ATTORNEY

United States Patent Office 3,160,742
Patented Dec. 8, 1964

3,160,742
COMPOSING COMPUTER AND INDICATOR
Pierre Jean-Baptiste Astier, 4 Rue Eugene Jumin,
Paris 19, France
Filed Dec. 28, 1960, Ser. No. 79,032
Claims priority, application France Dec. 29, 1959
10 Claims. (Cl. 235—164)

The present invention relates to an improved device for indicating the summation of at least two variables, each variable being itself the summation of a plurality of invariables, the said device being particularly useful in measuring and controlling the length of line of type being composed on the keyboard of a composing machine and, more particularly, on the keyboard of a machine of the "Linotype" type.

This device is particularly advantageous in the case where the keyboard of a composing machine operates a device for punching a paper tape, which tape, upon being perforated according to a special code, is subsequently used for the automatic operation of a composing machine.

It is presently known to operate a composing machine, such as a "Linotype" machine, automatically from a paper tape punched according to a special code. This paper tape is perforated by an apparatus independent of the composing machine.

The present invention is adapted for use in the case where said apparatus, independent of the composing machine, comprises a keyboard whose keys are actuated in a manner similar to that of a composing machine keyboard.

When the operator works on such a keyboard (independent of the machine) and has already pressed a certain number of keys, he must be able to check the line formed, this operation being known in the art as "justification." This justification is achieved by means of a device forming the subject-matter of the present invention. It can also be called a composing computer and indicator.

This composing computer and indicator must be designed so as to take into account both the width of the letters which will compose the line and the body of these letters; it must also faithfully and rapidly reproduce the operator's input.

The device according to the invention is thus essentially characterised in that each key which is actuated on the keyboard acts on an electrical system adapted to convert the signal corresponding to each key from the decimal system to the binary system for computation. Preferably, the result obtained in accordance with this binary system can be read directly by means of one or more luminous indicators corresponding to a graduated scale as the line of type progresses during the course of composition.

The preferred system for showing this result comprises two luminous indicators, viz: a first indicator positioning a ray of light in front of a graduated scale, and supplying, as it advances, an indication which is a total function of the maximum and minimum width of the spaces, so as to obtain a correct justification of the line, and a second indicator positioning a ray of light which advances in the opposite direction to the direction of the first indicator and supplying an indication which is a function of the combined width of the letters.

The scale can be graduated, according to the invention, in any typographic units, such as cicero, em scale, etc.

According to one advantageous embodiment, the scale is rectilinear and includes two sets of graduations, the lower of which corresponds to the letters and the upper to the spaces.

The lower set can be, for example, graduated in units of 3 typographic points (the typographic point having a value equal to $\frac{1}{12}$ of the typographic unit used) and the marking of this set can cover the scale from 0 to 30 typographic units (e.g. 30 ems), it being understood that the length of this scale can be varied in accordance with the type of typographic unit employed and with the length of line it is desired to obtain.

It will therefore be understood that in stating that the 30 typographic units forming this particular scale correspond to 360 typographic points, this is in no way restrictive, being merely chosen by way of example for purposes of illustration.

It is known, on the other hand, that the values corresponding to the widths of the spaces can vary, for example between a maximum of 9 and a minimum of 3 typographic points.

According to a specific feature of the invention, to each depression of the space key there corresponds an indicator which takes into account the maximum and minimum widths of the spaces. The number of corresponding typographic points is added each time the space key is depressed and the line can be considered as "justified" when the indicator corresponding to the letters occupies a position intermediate between the position occupied by the space indicator and its zero position or position from which the space indicator starts to advance. If each typographic unit selected is represented by 128 counting units, these 128 counting units will correspond to the binary number $2^7$.

It follows from the example chosen by way of illustration that a scale of 30 typographic units corresponds to 3,840 counting units, that each typographic unit which comprises 12 typographic points corresponds to 128 counting units, and that 3 typographic points correspond to 32 (or $2^5$) counting units.

In accordance with the font of the matrices selected, it will be known that each sign corresponds to a certain number of units in width and the invention aims at converting each of these groups of units, which are of the decimal system, to the binary system.

The apparatus according to the invention is thus characterised in that it comprises a special "programmer" which is specific to a specific matrice font.

This programmer cooperates with an electric binary computing system which will be called "totalizer." This totalizer is so designed that each time the result of the addition of the counting units, in the case of letters, corresponds to the binary number $2^5$ (which represents 32 counting units), a luminous indicator is lit in front of the letters scale. This luminous indicator thus indicates three typographic points. Obviously, the arrangement could be such that the luminous indicator lights up on the scale each time the result of the addition corresponds to the binary numer $2^6$, which is 64 counting units, or 6 typographic points, but such an arrangement could be detrimental to the accuracy of the justification of the line.

According to a specific embodiment, the totalizer includes two main circuits, the first of which is directly connected to the programmer and will be referred to hereafter as the "actuator-timer," and the second circuit, which is the binary computer part of the totalizer circuit proper, cooperating with said actuator-timer and comprising, for each power index, a plurality of relays which, when the apparatus is operating, are or are not set to allow the passage of a current from the actuator-timer, which current will be called the "scanning current." The open or closed setting of the relay blades will therefore determine, for each index, whether or not the scanning current will pass. Each circuit corresponding to each power index includes so-called "memorizing" relays and so-called "holding" relays. In other words, each power index circuit must be capable of adding two binary numbers. This addition of binary numbers is known and it will be sufficient here to merely recall, in a code corresponding to four unit columns, the following known data:

$$N+N=N$$
$$N+Y=Y$$
$$Y+N=Y$$
$$Y+Y=N \text{ retaining } Y$$

wherein $N$=no=zero in the standard mathematical representation of the binary code, and $Y$=yes=unity in the standard mathematical representation of the binary code.

The programmer is in the form of a plug provided with a plurality of pins corresponding at least to 90 keys of the keyboard. The pins are wired to one another in accordance with the alphabet length of the characters used and in accordance with the font of the matrices.

Further features and advantages of the invention will become clear on reading the following description in connection with the accompanying drawings in which:

FIGURE 1 is a diagrammatic view of a conventional unit comprising a keyboard key and a matrix-escapement device through a cam;

FIGURE 2 is a diagrammatic view of a unit comprising a keyboard key and the electric control device according to the invention;

FIGURE 3 is a view of the profile of a modified cam suitable for use in conjunction with the apparatus of the invention (full lines), the portions of an older type of "Linotype" cam which would be unsuitable for this invention appearing in chain-dotted lines;

FIGURE 4 is a diagrammatic view of one example of the wiring inside a programmer;

FIGURE 5 is the circuit diagram of the totalizer according to the invention;

FIGURES 7 and 7A are circuit diagrams of the space counter for lighting up luminous indicators corresponding to spaces;

FIGURE 8 is the circuit diagram of the so-called "comparator" device;

FIGURE 9 is a front view of the scale;

FIGURE 10 is a detail of FIGURE 9; and,

FIGURE 11 shows an alternative embodiment of the same detail of FIGURE 9.

Figure 6:
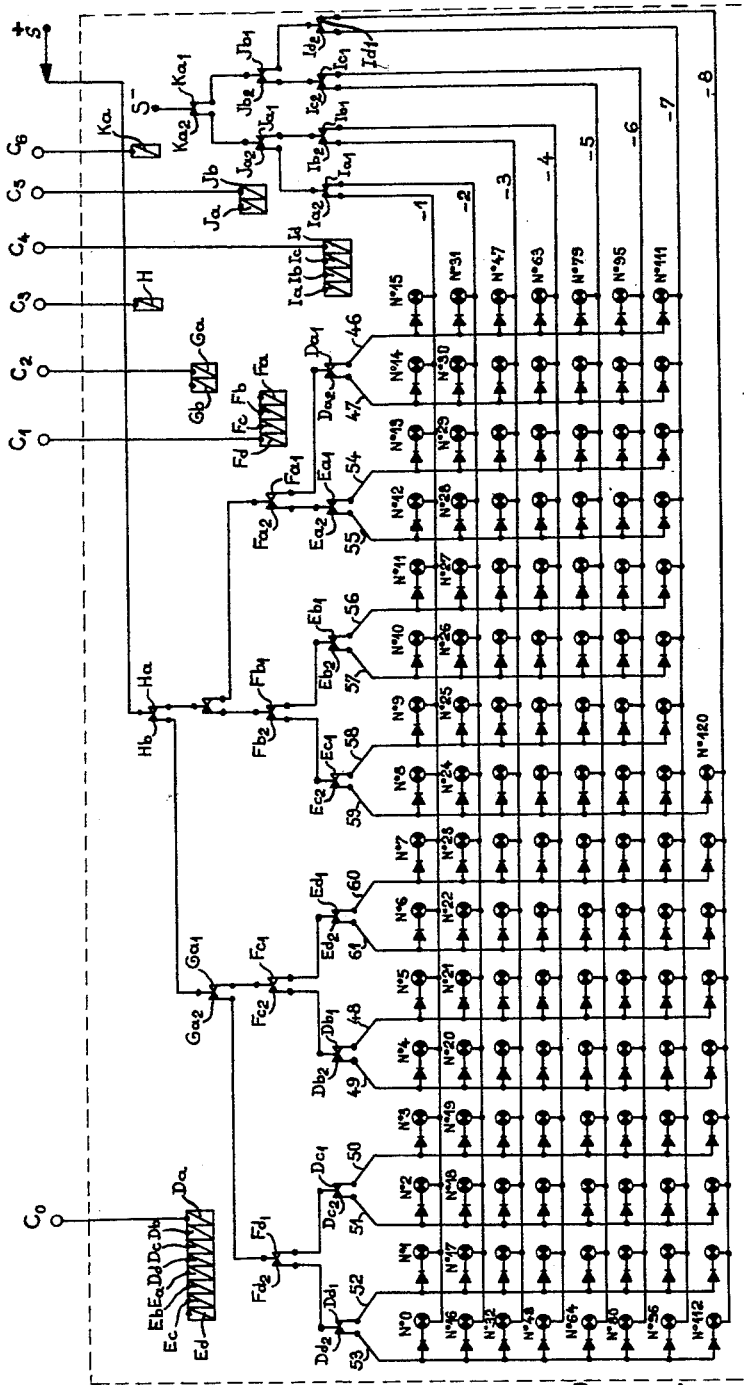
FIGURE 6 shows the electric circuitry for the energization of the luminous indicators corresponding to the characters.

Referring to the drawings, FIGURE 1 shows an explanatory diagram of the action of one key on the matrix-escapement device, in accordance with the conventional operation of a "Linotype" machine using the above-mentioned older type of cam. When the operator depresses any key 1, the corresponding counter-weight 2 is lifted and acts, through the bank 3 provided at the upper portion thereof, on a trigger 4 cooperating with a yoke 5 having a cam 6 idly mounted thereon.

The cam 6 is rotatable by a roller 7. The yoke 5 further cooperates with a link 8 which operates in turn the matrix-escapement device through a linkage 8a–8b. The applicant does not believe it necessary to describe the operation of this system, which is well known to those skilled in the art. This particular diagram has been given merely for purposes of comparison. Everyone skilled in the art knows that upon a key being depressed, it initiates a rotational cycle of the corresponding cam, as well as the triggering of a matrix.

It is to be noted that the time of action of this older type of cam, taking into consideration the normal speed of rotation of the roller 7 in conventional "Linotype" machines, is decided by the profile of the active surface 6b (FIGURE 3) of the cam. This active surface is equal to about half of the total perimeter of the cam. Since the main active time is equal to 0.1 second in a conventional "Linotype" machine, the total time of rotation of such a cam can be estimated as being about 0.2 second. Thus, the angular speed of rotation of the cam is known and, accordingly, so is that of the rotary roller which drives this cam as said roller and said cam have about the same diameter, which speed is of about 300 turns per minute, corresponding to the usual angular speed in a conventional "Linotype" machine. It will be further appreciated that the active part of any cam is a function of the normal dimensions and rotational speeds prevalent in a conventional "Linotype" machine, any variation in the ratio of the circumferential speeds of the roller to the cam and/or of the dimensions of either the cam or the roller, or of both, having a predictable effect on the operational time-period of the cam used. Further calculations carried out on a conventional cam show that the real time of operation of the cam takes place over an angular path of about 180°. Referring now to FIGURE 2, and using a cam 6a loaded at 9 and having a modified profile similar to that shown in full lines in FIGURE 3 by way of example (the profile corresponding to the omitted parts of an unmodified cam being shown in chain-dotted lines in this figure), the matrix-escapement device 8a–8b is replaced by electric contacts 10 and 11; the electric contacts 10 are located in the supply circuit for a punching unit, which is not included in the scope of the present invention, while contacts 11 are located in the supply circuit for the computing device forming the subject-matter of the present invention.

As concerns the specific profile of the cam illustrated in FIGURE 3, which is particularly advantageous for use with the apparatus of the present invention, this has been designed so as to obtain a response time corresponding to an active run on the cam comprised between 3 milliseconds and 1/30 of a second. Assuming that 1/10 of a second is required for an angular active run of 180°, a simple calculation enables the evaluation of angles corresponding to periods ranging from 3 milliseconds to 1/30 of a second. Thus, an active angular path of a value comprised between 5.4 and 60° is obtained. Otherwise stated, the active angular path of a cam suitable for use with the invention must lie between 5.4 and 60°. The applicant has conveniently adopted a value of 18° (6d), which corresponds to an active response time of 1/100 of a second, amply sufficient for manual control of the machine.

In FIGURE 3, is shown one practical embodiment of a modified cam suitable for the invention (shown in full lines). This embodiment comprises, following the profile of the cam through a cycle of revolution in the direction shown by the arrow ff, ramps in contact with roller 7 which are non-active, i.e. do not lead to any action on the electric contacts. These are the ramps 6c and 6e which are adapted to lead yoke 5, on rotation of the cam, to its upper maximum position, thereby allowing electric contact. The start of this upper maximum position corresponds to the start of run 6d. The toothed portion 6e serves to increase the friction necessary for turning the cam until the run 6d is reached. The yoke 5 stays in its upper maximum position during the run along 6d. This yoke then starts to descend, cutting electric contact, when roller 7 runs along the portion 6f of the cam until it regains its lower minimum position from whence it started. In order to aid the cam in its rotation, a ballast-weight 9 is advantageously provided as indicated. It is to be noted that, by contrast, the conventional cam has openings 6g which lighten one side of the cam with the same object of assisting its rotation, but these openings would present mechanical and constructive difficulties in the modified cam. Also provided at the high point of the cam is a conventional cam pin 6h cooperating in the usual manner with the retaining pawl 6k existing on a conventional "Linotype" machine.

It is to be understood that any mechanism between the key and matrix escapement providing a response time of the order required would be equally suitable for use in conjunction with the apparatus of the invention.

Referring now to FIGURE 4, which shows a programmer for a given matrix setting, the keys or signs corresponding to lines or circuits are identified by references: T1, T2, T3 . . . T90, while the lines or circuits cooperating with the former circuit are identified by the references K0, K1, K2 . . . K6.

The example of the wiring of this programmer illustrated by way of example is such that:

The key or sign T1 corresponds to a sign of 22 counting units, or $2^4+2^2+2^1$, The key or sign T2 corresponds to a sign of 41 counting units, or $2^5+2^3+2^0$, The key or sign T3 corresponds to a sign of 35 counting units, or $2^5+2^1+2^0$, The key or sign T4 corresponds to a sign of 32 counting units, or $2^5+2^0$, The key or sign T5 corresponds to a sign of 64 counting units, or $2^6$, The key or sign T6 also corresponds to a sign of 33 counting units; it can thus be directly connected to the circuit of the key T4 . . .

The key or sign T90 corresponds to a sign of 68 counting units, or $2^6+2^2$.

The circuits K0 to K6 are connected, on the one hand, with the so-called "actuator-timer" block identified by the general reference 12 (FIGURE 5) and, on the other hand, with the so-called "power index" block ($2^0$ to $2^6$, corresponding to 127 counting units in accordance with the sum $2^0+2^1+\ldots+2^6$), this index block being parallel-connected and generally identified by the reference 13. Each line K0 to K6 is connected, for example, at Ka,Kb,Kc . . . Kg, with said index block 13 through an independent circuit supplying the different relays P0 to P6. This parallel power index block is also connected to an additional power index block ($2^7$ to $2^{11}$) mounted in series. This second index block is generally identified by the reference 13a. It is capable of supplying from 255 to 4,096 counting units.

The blocks 12 and 13 will now be described and explained, these being comprised by a certain number of electric circuits including relay means.

The electric circuits shown in FIGURE 5 contain a plurality of relays and switch blades cooperating with said relays. As is conventional, each blade has been illustrated by a black triangle when in engagement (closed circuit) and by a white triangle when not in engagement (open circuit).

The relays identified by hatched rectangles represent, as is conventional, slow-acting relays; the relays identified by diagonally crossed rectangles represent quick-acting relays and the relays identified by white rectangles represent very slow-acting relays.

When the cam 6a is inoperative and considering the actuator-timer block 12: this block comprises six current inputs 14, 15, 16, 17, 18 and 19. The current passes into the circuit D and E from 14 and 15. The current arriving from 17 energizes the relay 20, which closes the corresponding contact 20a, enabling it to be self-energised by the current arriving from 16. The current from 16 passes thus into the circuit C; the relay 21 is inoperative.

The current from 15 energizes the relay 22, which then closes the corresponding contact 22a, thus energizing the relay 23, and opening the contact 23a.

When the cam 6a is operating and an electric contact is established at 11 (FIGURE 2), the code corresponding to the key depressed and coming from the programmer arrives at Kn. This produces a current in the line Kp which energizes the relays 28, 29. The energization of these relays opens the contact 28a and closes the contact 28b. The circuit D is no longer supplied, but it will be seen later that this discontinuation of supply is only momentary. On the other hand, no current flows into E due to the opening of the contact 29a.

The relay 30 is also energized, thus opening the contact 30a and closing the contact 30b to feed a signal from 17 to A and to the relay 25 to close contact 25a. On the other hand, the relay 31 is energized, thus closing the contact 31a, and relay 31 is self-energized by the current flowing from 19.

The opening of the contact 30a cuts the energization circuit of the relay 20, and the opening of the contact 29a cuts the energization circuit of the relay 22 and therefore of the relay 23. The relays 25–26 are accordingly self-energized by the current from 18. The current is then re-established at D, due to the energization of the relays 25 and 26 closing the contact 26a. Current is thus re-established at D from 18, but is maintained at C from 15, the contact 29b being closed following energization of the relay 29.

On the other hand, due to energization of relay 28, the contact 28b being closed, the relay 21 is energized and 16 supplies the relay 32, thus cutting off the self-energization of the relay 31 by the current from 19, and the starting position is resumed as soon as the current from Kp is discontinued. This is the period corresponding to the termination of computation. It has been seen that, at termination of this period of computation, C is still fed, since the relay 21 is slower-acting than the other relays such as 30, 28, 29.

At the end of the cycle of the cam, when the relays 30, 28 and 29 are de-energized, the current from 17 is prevented from going to A and passes to energize the relay 20, but it does not flow directly towards C due to the rectifier 20b. On the other hand the current is cut-off immediately at C due to the de-energization of the relays 28, 29, and it is only reestablished after a delay at C from 16 due to the delayed opening of the contact 21a by the slow-acting relay 21. Thus, it is apparent that C is cut-off only momentarily.

To sum up, the function of this actuator-timer 12 is to provide:

At rest, a scanning current E and a supply for C and D;

When the cam is operative, the cutting-off of the supply to E, a very brief cutting-off of the supply to D and a supply to A, a re-supply to D, the very brief cutting-off of the supply to C, the cutting-off of the supply to A and finally a re-supply to C.

The operation of the power index block 13 will now be described.

It has already been stated that the signals corresponding to the code of each key are capable of energizing the corresponding relays P0 to P6, due to the lines Ka to Kg. These relays are self-energizable by the current from D, which current is established as has been disclosed in connection with the operation of the actuator-timer block 12. It has also been stated that the current at D was cut-off during a short period of time. The purpose of this cut-off is as follows: if one of the relays such as P0 to P6 is energized by a corresponding code Ka to Kg and current passes in D, said relay P becomes self-energized. But if the supply in D is discontinued and the corresponding relay P is still energized, the blade of the corresponding contact, d0 to d6, still keeps the corresponding circuit da to dg closed. If one of the relays P0 to P6 is no longer energized and no more current is fed through D, the corresponding contacts d0 to d6 open, and any current which may arrive in D can no longer flow into the corresponding circuits da to dg. This same remark can be made with respect to the so-called "memory" relays in the circuits of each of the index powers M0 to M6, the current from C being also cut off for a short period, as shown above. It follows that, when a signal no longer acts on one of the relays P or M, the corresponding blades of these relays not closing the corresponding circuits, even if current flows in D or C, this current cannot flow any further in the circuitry.

In order to explain the operation of the totalizer of the invention, it will be advantageous to consider the various cases which can occur. The examples which will be described hereunder will be given in considering one power index circuit, but it should be understood that the same reasoning applies for all the other circuits when the latter are presented with one of the cases about to be studied.

(I) *Energization Signal in One of the Relays P1 to P6: No Memorization in the Corresponding Power Index Circuit and no So-Called "Retaining" Signal From a Preceding Circuit*

Assuming that a signal $Kb$ energizes the relay P1. The blade $d1$ closes the circuit (for all the other relays which are not energized by a signal the corresponding blades $d$ stay open).

When current flows through D, it will only pass into the corresponding circuits $db$–$dg$ if the corresponding contacts $d$ are closed. Thus, in the case of P1, the current from D self-energizes P1 (and the other relays which are in the same state as P1).

The current from D, $d1$ being closed, flows into $db$ and energizes the corresponding relay $q1$.

When no key is depressed, which corresponds to a condition which will be defined hereafter as "rest period," the primary energization of P1 stops while D is still supplied as has been seen hereabove in the explanation of the operation of the actuator-timer; accordingly, P1 is still self-energized by the current from D.

As has also been seen in the explanation of the actuator-timer, a so-called "scanning current" is established in E; the circuit E comprises branches E0 to E6.

In the case of the circuit P1, the scanning current from line E may act at the line E1. Since the relay $q1$ is energized by the current from D, the corresponding contact such as $qa$ opens and the contact such as $qb$ closes. The current E1 can thus flow through the circuit such as $qb$–33 to energize the relay $m1$ which closes the contact such as 34, thus enabling the current E1 to proceed along 35–36 to energize the memory relay M1, which is self-energized by the current from C. The energization of this relay M1 closes the contact such as 37 in the circuit of A, which can be fed during an operation, as has been seen during the description of the actuator-timer. The work of this particular power index has thus translated: $N+Y=Y$.

Under this condition, and still using the same circuit of P1, the following case can be taken into consideration:

(II) *New Signal at P1 With Memorization at M1*

It has just been seen that M1 is energized.

As in the former case, $q1$ is again re-energized; and, on the other hand, during operation of the cam corresponding to the key depressed, a signal is fed to A. Since 37 is in the closed position, the current from A can energize the relay such as $t1$, which will then be self-energized by current from D, the corresponding contact such as 38 then being closed and the current from D can energize relays such as R1 and V1, which relays will also be maintained in a state of self-energization due to the self-energization of $t1$.

The short interruption of the supply at C at the end of an operation results in M1 being de-energized and, accordingly, the circuit from A is cut-off. However $t1$, R1 and V1 remain self-energized by the current from D.

The relay R1 opens the contact such as 33 and closes the contact such as 34a.

*Rest period.*—The relay $q1$ still being energized by the current from D, the current E1 can flow along $qb$–34a to be fed to a line such as $x1$, which is a so-called "retaining line," resulting in the next power index circuit being affected, there being nothing more flowing in the power index circuit under consideration up to this moment.

The case which has just been examined corresponds to the addition:

$$Y+Y=N \text{ with a } Y \text{ retained}$$

(III) *Nothing in Memory, a Y Retained and a Signal at P*

Still considering P1 whose circuit has received a retention carried over from the preceding circuit, has nothing in memory and receives a new signal:

*Operative period.*—The cutting-off of D de-energizes $t1$ and, thus, the relays R1 and V1 are also de-energized. The new supply to D and the new energization of P1 cause the latter to be self-energized by D. The current from D energizes $q1$ and S1.

*Rest period.*—The scanning current E1 flows through $qb$–33, energizes $m1$ and does not flow any further since the relay F1 has been energized by the retaining current from $x0$.

The current from $x0$ (S1 being energized) flows into the retaining circuit $x1$ for the next higher power index through $Sa$, $Sb$, $Sc$ ($V1$ being de-energized, which results in the contact such as $Sd$ being opened, and the contact $Sc$ being closed).

This actually corresponds to the binary addition:

$$N+Y+Y=N+Y \text{ retained}$$

(IV) *Nothing in Memory—a Y Retained*

During operation nothing happens.

During the rest period or scanning period, the retaining current $x0$ from the preceding stage flows through $Sf$–$Sd$–35–36 to energize M1 and the power index under consideration will be "memorized." This corresponds to the binary addition:

$$N+Y=Y$$

(V) *A Memorization, a Y Retained From the Preceding Stage and a Signal in the Same Power Index*

*Operative period.*—V1–R1 will have been self-energized by a current from A; $q1$ and S1 are energized.

At the end of the operation, M1 is de-energized and the supply circuit for A is cut-off. But R1–V1 remain self-energized by a current from D, as well as $q1$ and S1.

*Scanning.*—The current E1 flows directly in the retaining circuit $x1$ of the higher power index through $qb$–34a, and $x0$ from the preceding power index flows through $Sa$–$Sg$–35–36 to energize M1. A new memorization will finally be obtained in the circuit under consideration plus a retention in the next higher power index. This corresponds to:

$$Y+Y+Y=Y \text{ plus a } Y \text{ retained}$$

(VI) *A Memorisation, Nothing Retained and No Signal*

During the operation of the cam, R1–V1 are self-energized by a current from A; $q1$ is not energized.

*Scanning current.*—E1 energizes $m1$ along the circuit $qa$–33a and maintains the energization of M1.

This is a result corresponding to the binary addition:

$$Y+N=Y$$

(VII) *A Memorisation, A Retention, No Signal Affecting the Power Index Under Consideration*

During the operation of the cam, R1 and V1 are self-energized by a current from A.

At the end of the operation, M1 is de-energized.

*Scanning.*—S1 is not energized and the retaining current $x0$ flows directly through $Sf$–$Sc$ in the retaining circuit of the next-higher power index, and there is, accordingly, nothing more in the memory of the power index under consideration. This corresponds to the addition according to the binary system:

$$Y+Y=N \text{ with a } Y \text{ retained}$$

(VIII) *No Memorisation, No Retention, No Signal*

During the operation of the cam, nothing happens. The scanning current is arrested everywhere.

The entire unit whose operation has just been described is designed in such a way that when the addition of the counting units affects the power $2^5$ (32 counting units) or when this power is directly affected, a luminous indicator in front of the graduated scale is fed by the current supply for the line $C_0$; if the result of this addition affects the power $2^6$ (64 counting units), a luminous indicator lights up directly at the corresponding position in front of said graduated scale, due to the line $C_1$ being supplied with current.

When both of the powers $2^5$ and $2^6$ are in the so-called "excited" condition (memory or retention), the light corresponding to thrice 32 counting units is lit, as will be seen hereunder; that is to say, the light located on the scale at 96 counting units (3 divisions of the scale).

If the result of an addition reaches 128 counting units, the power index block $13a$ is affected as follows:

The current of $x_6$ directed into the first stage of the power indices $13a$ corresponds to the number of counting units $2^7$. (The operation of one of these power indices will now be described, it being understood that the other power index circuits operate similarly and that, due to the series connection thereof, they are successively affected by the number of counting units represented by from $2^8$ to $2^{11}$).

A direct current arriving at 40 energizes the relay $V_7$, closing the corresponding contact $V_{7a}$, enabling the current to flow through the line $G_7$ to energize the relay $M_7$ and momentarily self-energize the relay $V_7$; due to the energization of $M_7$, the current from 40 self-energizes $M_7$ and feeds $C_2$, so that an indicator corresponding to $2^7$ counting units can be lit. Upon the current is $x_6$ being discontinued, $V_7$, which is no longer fed by $x_6$ is no longer energized.

During a second passage of a current in $x_6$, $V_7$ no longer being energized and $M_7$ being still self-energized by 40, the current from $x_6$ flows through the closed contact $V_{7b}$ into the line $x_7$ to energize the relay $F_7$, which cuts-off the self-energization of $M_7$ by 40, the contact $F_{7a}$ then being open.

This pulse which affects $x_7$ then affects the second stage of the power indices $13a$, in the same manner as that just described.

When this second pulse in $x_6$ stops, $F_7$ is de-energized and the initial condition described above for the first stage of the power indices $13a$ is resumed.

It follows that the power index stages $13a$ translate counting units in the following order:

| | Counting units |
|---|---|
| 1st stage | 128 |
| 2nd stage | 256 |
| 3rd stage | 512 |
| 4th stage | 1,024 |
| 5th stage | 2,048 |

This block thus enables the entire scale of 3,840 counting units to be covered, since the sum of all the powers shown in this diagram ($2^0+2^1+2^2+\ldots+2^{11}$) represents 4,095 counting units.

Still referring to FIGURE 5, it is to be remarked that each time the space key is depressed, the power stage $2^5$ is directly affected by $Kf$, thus enabling, through $C_0$, 32 counting units or 3 points to be translated, i.e. to light up an indicator corresponding to the minimum of the spaces, on the letter-scale. It will be seen further on that the depression of the space key also affects the circuit corresponding to the indicators in front of the space scale.

The signals fed through lines $C_0$–$C_1$–$C_2\ldots C_6$ are used to trigger the computing device proper, whose electric circuit diagram is illustrated in FIGURE 6 (or circuit diagram for the luminous indicator wiring). This set-up and operation will now be described simultaneously.

The line $C_0$ is connected to a plurality of relays $Da$, $Db$, $Dc$, $Dd$, $Ea$, $Eb$, $Ec$ and $Ed$. These relays have been diagrammatically illustrated in FIGURE 6 as a block group for purposes of clarity in the drawing. The corresponding blades operated by these different relays are identified by the corresponding references $Da1$–$Da2$, $Db1$–$Db2$, $Dc1$–$Dc2$, $Dd1$–$Dd2$, $Ea1$–$Ea2$, $Eb1$–$Eb2$, $Ec1$–$Ec2$, $Ed1$–$Ed2$. Each blade of each of these pairs of contacts is connected to an electric circuit such as 46–47, 48–49, 50–51, 52–53, 54–55, 56–57, 58–59, 60–61. Each of these circuits can itself be supplied with an electric current of positive polarity whose source is identified by way of example by the general reference $S^+$. The circuit from $S^+$ comprises a plurality of contact blades, each corresponding to a relay connected in the circuits from $C_0$, $C_1$, $C_2\ldots C_6$. Thus, for example, the line from $C_1$ is capable, on the occurrence of a pulse at $C_1$, of energizing the four relays $Fa$, $Fb$, $Fc$, $Fd$; the contact blades corresponding to these relays are respectively $Fa1$–$Fa2$, $Fb1$–$Fb2$, $Fc1$–$Fc2$, $Fd1$–$Fd2$; the line from $C_2$ is capable, on the occurrence of a pulse, of energizing the relays $Ga$–$Gb$, which respectively control the blades $Ga1$–$Ga2$; $Gb1$–$Gb2$; the circuit from $C_3$ is capable, on the occurrence of a pulse, of energizing the relay $H$, which can act on the contacts $Ha$–$Hb$; the same is true for the circuits $C_4$, $C_5$, $C_6$, which act respectively on relays $Ia$, $Ib$, $Ic$, $Id$, $Ja$, $Jb$ and $Ka$, with the corresponding blades $Ia1$–$Ia2$, $Ib1$–$Ib2$, $Ic1$–$Ic2$, $Id1$–$Id2$, $Ja1$–$Ja2$, $Jb1$–$Jb2$ and $Ka1$–$Ka2$. Negative polarity is fed into the circuit illustrated in FIGURE 6 through the contacts $Ka1$–$Ka2$.

The operation of this diagram will be now explained:

Since, initially, there is no pulse affecting any of the circuits $C_0$ to $C_6$, the current from $S^+$ follows the path $S^+$, $Hb$, $Ga2$, $Fd2$, $Dd2$, the light No. 0, the line $-1$ and the contacts $Ia2$, $Ja2$, $Ka2$ to flow out at $S^-$. The light No. 0 is accordingly lit.

On the arrival of a pulse at $C_0$, as has been shown earlier, the relays $Da$ to $Dd$ and $Ea$ to $Ed$ are energized. The contacts corresponding to these relays are then switched, i.e. the contacts $Da1$, $Db1$, $Dc1$, $Dd1$, $Ea1$, $Eb1$, $Ec1$, $Ed1$, which were initially open are closed. The current from $S^+$ then follows the path: $S^+$, $Hb$, $Ga2$, $Fd2$, $Dd1$, and light No. 1 to be returned through the circuit $-1$, the contacts $Ia2$, $Ja2$, $Ka2$ to $S^-$. Light No. 1 is lit up while light No. 0 is extinguished. This light No. 1 thus corresponds to 32 counting units. It has already been seen that, as composition proceeded, the circuits $C_1$, $C_2\ldots C_6$ were sequentially affected. Still referring to FIGURE 6, upon arrival of the pulse at $C_1$, the relays $Fa\ldots Fd$ are energized, acting to close the corresponding contacts which were initially open, viz: $Fa1$, $Fb1$, $Fc1$, $Fd1$. The current from $S^+$ can thus follow the path: $S^+$, $Hb$, $Ga2$, $Fd1$, $Dc2$, light No. 2, line $-1$, contacts $Ia2$, $Ja2$, $Ka2$ and $S^-$. Light No. 2 is lit up and light No. 1 is extinguished.

The light No. 3 lights up when, as earlier stated, the two powers $2^5$ and $2^6$ are in the so-called "excited" state, i.e. when the current can flow into $C_1$ and into $C_0$. By following the circuit diagram in FIGURE 6, with the circuits of $C_1$ and $C_0$ affected, it can be seen that the current from $S^+$ can follow the path: $S^+$, $Hb$, $Ga2$, $Fd1$, $Dc1$, light No. 3, line $-1$ to return to $S^-$, as previously. This light No. 3 thus translates 96 counting units.

Light No. 4 lights up when the pulse arrives at $C_2$. Accordingly, the relays $Ga$ and $Gb$ are energized, closing the contacts $Ga1$ and $Gb1$. The current from $S^+$ can then follow the path: $S^+$, $Hb$, $Ga1$, $Fc2$, $Db2$, light No. 4 and line $-1$ to $S^-$, as before. This light No. 4 thus translates 128 counting units.

Light No. 5 lights up when the pulses arrive at the same time at $C_0$ and $C_2$.

Light No. 6 lights up when the pulses affect $C_1$ and $C_2$.

Light No. 7 lights up when the pulses affect $C_0$, $C_1$ and $C_2$.

Light No. 8 lights up when the pulses affect $C_3$, thus translating 256 counting units.

Light No. 9 lights up when the pulses affect $C_0$ and $C_3$.

The diagram of FIGURE 6 could be further followed in the same way to ascertain the manner in which lights No. 10 to No. 15 of the line —1 light up successively, increasing by 32 counting units from one light to the next, light No. 15 being lit up when the pulses arrive at C0, C1, C2 and C3.

Light No. 16 lights up when the pulses arrive at C4, the return current flowing through the line —2 towards S⁻, due to the contacts I$a$1 (energization of the relays I$a$ ... I$d$ corresponding to C4), J$a$2 and K$a$2. The return current flows through the line —2 until the lighting up of light No. 31. It will then take the line —3 and contacts I$b$2, J$a$1, K$a$2 towards S⁻ until the light No. 47 is lit up. It will return through the line —4 for light No. 48 to light No. 63, through the contacts I$b$1, J$a$1, K$a$2, to S⁻; the line —5 from light No. 64 to light No. 79, and the contacts I$c$2, J$b$2, K$a$1 to S⁻; the line —6 from light No. 80 to light No. 95 and the contacts I$c$1, J$b$2, K$a$1 to S⁻; the line —7 from light No. 96 to light No. 111 through the contacts I$d$2, J$b$1, K$a$1 to S⁻ and finally the line —8 from light No. 112 to light No. 120 and the contacts I$d$1, J$b$1 and K$a$1 to S⁻. This last light No. 120 can thus translate 3,840 counting units, the sequential lighting up of the lights being carried out, as earlier stated, with a 32 counting unit difference from one light to the next.

As regards the space scale, the luminous indicators are adapted to act in front of this scale by virtue of the electric circuit diagram shown in FIGURES 7–7A. This electric circuit diagram includes 5 stages of relays, each stage being connected to a separate circuit which is, itself, capable of affecting the wiring circuit of the luminous indicators. These stages of relays and their operation will now be described.

When a key, such as 1, corresponding to the space key, is depressed, electric contact is established through 11 (FIGURE 2), to act directly on said relay stages. If a value of 6 typographic points is adopted for the maximum of the spaces, the invention is designed so that the progression of the lighting up of the luminous indicators corresponding to the spaces proceeds by 2 typographic point steps (or 32 counting unit steps). These three points thus correspond to the difference between the value of the maximum of the spaces (6 typographic points) and the value of the minimum of the spaces (3 typographic points) selected. Thus a luminous indicator will be lit up on the space scale at each depression of the space key, and this luminous indication will progress in front of this scale by steps of 3 typographic points each.

Accordingly, if a pulse is fed into line 48 through contact 11 (FIGURE 2), reference to the diagram in FIGURE 7 will indicate the manner in which the relay stages illustrated therein operate in accordance with the wiring-up of these relays. Initially, the positive-polarity current from 401 energizes, through the closed contacts 521 and 551$a$, the relay 531. The energization of this relay closes the initially open contact 531$a$. A pulse from 48 can thus follow the line 541 and energize the relay 551, while momentarily self-energizing the relay 531. The energization of relay 551 closes the contact 551$b$ and opens the contact 551$a$, which enables the current from 401 to flow into the line I, causing a luminous indicator to be lit up, as will be seen hereafter. The relay 551 remains self-energized by the current from 401; upon the pulse being discontinued at 48, the relay 531 is de-energized and the contact 531$b$ closes while the contact 531$a$ opens. The pulse still continues to flow in the circuit I due to the source 401 and to the closed contact 551$b$. In this position, if a new pulse arrives at 48, the current flows, by virtue of the closed contact 531$b$, into the line 561 on the one hand, and line 571 on the other hand. The flow of current in 561 causes the relay 581 to be energized, which opens the contact 521 so that 401 can no longer supply the line I, whereby the relay 551 and the contacts 551$a$ and 551$b$ return to the position which they occupied at the start of the description of the operation of this diagram. Light No. 1 is thus extinguished. It is to be noted that the energization of the relay 581 only takes place during a period of time corresponding to that of the pulse fed in at 48. If the path along the line 571 taken by the current from 48 is now followed, the current in this line will penetrate into the second stage of relays which occupies the following position: the current from 402 (external positive-polarity source) energizes through the closed contact 552$a$, the relay 532, which closes the initially open contact 532$a$ so as to enable, on the one hand, the relay 532 to be momentarily self-energized and, on the other hand, the relay 532 to be energized by the current from 571. The energization of this latter relay opens the contact 552$a$ and closes the contact 552$b$, thus enabling the current from 402 to affect the circuit II and one luminous indicator, as will be seen later. When the pulse from 48 is no longer fed to the line 571, the relay 532 is no longer energized, but the relay 552 still remains self-energized by the current from 402; the contact 552$b$ still remains closed and the line II is still fed. When the pulse at 48 is discontinued, the relay 581, which was also energized is no longer energized and the contact 521 closes again. Upon a 3rd pulse at 48, a pulse is obtained, as in the first case, in the line I, but the pulse in the line II still exists, as has been explained hereabove, whereby the pulses in the lines I and II affect, in turn, a new circuit to supply another luminous indicator.

Upon this 3rd pulse in 48 being discontinued, and as in the first case, the relay 551 remains energized as well as the relay 552. When a 4th pulse passes at 48, the current again energizes relay 581 to cut the supply to said relay 551 by 401 and, accordingly, to the line I. This pulse is fed, as previously seen, to the line 571, but, since only the relay 552 is energized at that time in the stage under consideration, the current from 571 follows the line 562 through the contact 532$b$, which is closed, to energize the relay 582 and feed into the next stage by the line 572. The energization of this relay 582 results in the supply to the relay 552 by 402 being cut, which relay resumes its initial position. By means of the supply in line 572 it is the following stage which is affected due to the supply by 403. By reasoning similarly to before, it will be readily realized that line III can accordingly be supplied and that consequently a subsequent stage can also be affected once preceding stages have been successively affected.

In order to simplify the explanation of the lighting-up of the luminous indicators, the following table has been established:

1st pulse affects line I
2nd pulse affects line II
3rd pulse affects lines I and II
4th pulse affects line III
5th pulse affects lines I and III
6th pulse affects lines II and III
7th pulse affects lines I, II and III
8th pulse affects line IV
9th pulse affects lines I and IV
10th pulse affects lines II and IV
11th pulse affects lines I, II and IV
12th pulse affects lines III and IV
13th pulse affects lines I, III and IV
14th pulse affects lines II, III and IV
15th pulse affects lines I, II, III and IV
16th pulse affects line V.

Each of the lines I, II to . . . V is connected to one or more relays as the case may be. Thus, line I affects the relays 101, 102, 103 and 104, which act on the corresponding contact blades respectively designated as 101$a$–101$b$, 102$a$–102$b$, 103$a$–103$b$, 104$a$–104$b$; line II affects the relays 201 and 202, which act on the corresponding contacts 201a–201b, 202a–202b; the line III affects the relay 300, acting on the contacts 300a–300b; line IV affects the relays 400 and 444, acting on the corresponding contacts 400a–400b and 444a–444b; and finally the line V affects the relay 500, acting on the contacts 500a–500b. This whole electrical system is fed by an E.M.F. between S+ and S−.

This electrical system comprises, in accordance with the wiring which is illustrated in FIGURE 7A and in connection with the aforesaid contacts, a plurality of lights adapted to be lit up successively in accordance with the order of the pulses received.

When no signal is received in either of the lines I to V, the electric current from the external source follows the circuit S+, 300b, 202b, 104b, light No. 00 (which lights up), line −100, 444b, 500b, S−.

When a pulse is received as aforesaid in the line I, the relays 101 to 104 are energized, thus closing the corresponding contacts 101a, 102a, 103a and 104a, and opening the contacts 101b, 102b, 103b and 104b. The current from S+ therefore follows the path: S+, 300b, 202b, 104a, light No. 1, line −100, contacts 444b, 500b and S−.—Light No. I lights up and it corresponds on the scale to the graduation at 32 counting units, or 3 typographic points.

When a pulse arrives in line II, the relays 201 and 202 are energized, closing the contacts 201a and 202a, and opening the contacts 201b and 202b. The current from S+ follows the path: S+, 300b, 202a, 103b, light No. II, line −100, contacts 444b, 500b to S−. Light No. I is extinguished.

When circuits I and II are both fed, their respective relays 101 to 104 and 201, 202 are energized and, by acting on the corresponding contacts, the current can flow along the following path: S+, 300b, 202a, 103a, light No. III, line −100, contacts 444b and 500b, to S−.

It will thus be seen that, with the combination of signals received in the lines from I to V in accordance with the aforementioned table, it is possible to light up successively the lights No. I to No. XVI of the diagram shown in FIGURE 7A by steps corresponding to 3 typographic points, the return of the currents from S+ being successively effected through the lines −100, −200 and −300.

These lights Nos. I to XVI are respectively located in the position of the first 16 graduations on the space scale shown in FIGURE 10, each of these graduations representing 3 typographic points.

The electric circuit diagrams illustrated in FIGURES 7 and 7A further provide for the possibility of causing luminous indicators to progress in front of said space scale by steps of 6 typographic points, if the value adopted for the maximum space is 9 typographic points. Since the computation is carried out based on the difference given by maximum of the spaces minus minimum of said spaces (which minimum is 3 points), this explains the progression of the luminous indication by steps of 6 points.

Referring again to FIGURE 7, a switch 49 enables a supply of current from 11 (FIGURE 2) either to line 48, as previously seen, or to the line 48a in the case of the maximum of the spaces being of 9 points.

Should a pulse be fed to 48a, the electric current flows directly through the line 571 due to the presence of the rectifier 571a to directly affect the stage corresponding to line II. As before, the current from 571 energizes, through the closed contact 532a, the relay 552. Contact 532a is closed following the energization of the relay 532 by the current from +402, the contact 552a being in the closed position. The energization of the relay 552 results in the closing of contact 552b and the opening of the corresponding contact 552a, which enables the current from +402 to supply line II.

The pulse received in this line II then acts directly on the light No. II. On the occurrence of a second pulse at 48a, the contact 532a being open following the de-energization of the relay 532, the current passes directly into the line 562 to energize the relay 582. This energization results in the cutting off of the supply to relay 552 following the opening of contact 522. The current in 562 also supplies the line 572 of the next stage, resulting in a pulse being transmitted into the line III, said pulse being obtained (as has already been explained) by virtue of the source +403 which energizes the relay 533, thus closing the contact 533a and opening the contact 553b. The curent in 572, by flowing through line 543 can then energize the relay 553, which closes the contact 553a and opens the contact 553b. The line III is accordingly fed by 403. It then follows that the relay 300 connected to the line III is energized, which opens the contact 300b and closes the contact 300a; the current from S+ then takes the following path: S+, 300a, 201b, 102b, light No. IV, line −100, contacts 444b, 500b to S−. It will thus be seen that light No. III has been by-passed.

Still following the electric circuit diagram of FIGURE 7, and for each pulse fed to 48a, the different stages from II to V can be successively affected, this being summed up in the following table.

1st pulse affects line II
2nd pulse affects line III
3rd pulse affects lines II and III
4th pulse affects line IV
5th pulse affects lines II and IV
6th pulse affects lines III and IV
7th pulse affects lines II, III and IV
8th pulse affects line V
9th pulse affects lines II and V
10th pulse affects lines III and V
11th pulse affects lines II, III and V
12th pulse affects lines IV and V
13th pulse affects lines II, IV and V
14th pulse affects lines III, IV and V
15th pulse affects lines II, III, IV and V.

The pulses received in these lines sequentially cause the lighting up of the lights identified by even numbers, e.g. lights VI, VIII . . . XXX.

All of these even-numbered lights each correspond to a mark on the space scale, each mark being representative of 6 typographic points of 64 counting units.

When the operator has completed a line he cuts off the current supplying all the relay stages so far described by any suitable means, such as by depressing a so-called "end-of-line" key, thus returning all the relay stages to their starting positions.

The present invention provides a means adapted to inform the operator that he is nearing the justification of his line, said means being audible or luminous. The operator should preferably be informed at the very moment when the luminous indicator corresponding to the characters is located in correspondence with the indicator corresponding to the maximum of the spaces.

This object is achieved by means of the electric circuit diagram shown in FIGURE 8, the principle of whose operation will be hereafter described.

This electric circuit diagram comprises two stages each comprising a plurality of relays such as 65 to 78 for the first stage and 79 to 92 for the second stage. It is to be understood that the actual number of the relays forming these stages is given here merely by way of illustration for purposes of explanation. The upper stage of FIGURE 8 corresponds to the space scale, while the lower stage corresponds to the sign or character scale. This diagram is very properly designated the "comparator" circuit. Each of the relays is connected in parallel with each of the lights or indicators as mentioned in connection with the space and character scales. This connection in parallel is effected through the lines −59c+59c, −59d+59d . . . −59r+59r for the relays 65 to 78, and through the lines −92b+92b, −91b+91b . . . −79b+79b for the relays 92 to 79, respectively.

It will be appreciated that upon any of the relays 65 to 78 being energized (which energization occurs when the corresponding indicator on the space scale lights up), the corresponding contacts 65b to 78b are closed.

The same reasoning would apply to the relays 79 to 92, which correspond respectively to the indicators of the character scale. It will be further appreciated that the energization of any one of these relays 79 to 92 will result in the closing of the corresponding contacts 79c to 92c.

It will be seen immediately that if two relays, of which one belongs to the space relays and the other to the character relays, are simultaneously energized while they are located on the same vertical in the figure, a current from an external source can flow through lines such as 93a to 93n to supply the line 94 which can trigger an alarm device, for example a light or a bell 95. This occurrence also corresponds to the positioning of an indicator of the character scale in correspondence with an indicator of the space scale and vice versa.

The luminous indicator scale has been diagrammatically illustrated in FIGURE 9, and is graduated in terms of 3 typographic points and numbered in typographic units, totalling 30 typographic units in the case illustrated in FIGURE 9. The character scale is generally identified by the reference EM. As to the space scale, it is also graduated in terms of a certain number of typographic points and numbered from 0 to 8. Up to the graduation mark 4 it is graduated to correspond to 3 typographic points for the case where a value of six points has been selected for the space maximum. It has already been seen that for this case a luminous indicator lights up for every 3 points. On the other hand this 3-point graduation is no longer necessary when the selected maximum space value is 9 points. In this latter case the luminous indicators are adapted to light up in steps of 6 points, which corresponds, as has already been explained, to such a 9-point maximum. The scale is therefore twice as long, the graduation marks being extended from mark 4 to mark 8 in steps representing 6 points each to allow for this latter case.

Each of the various afore-described lights cooperates with a device shown in FIGURE 10 for sending a beam of light onto the graduations of the scale shown in FIGURE 9. Beneath each light such as Lx (FIGURE 10) is located an optical means adapted to reflect the light rays in accordance with the arrow shown in FIGURE 10, enabling this light to be seen on the scale EM. Obviously, each optical means can be enclosed in a small channel (not shown) corresponding to the graduation represented on the scale illustrated in FIGURE 9.

In accordance with an alternative embodiment shown in FIGURE 11, the lights are located directly behind a slot corresponding to a graduation of the scale of FIGURE 9. These lights, such as Lx, are of small dimension and elongated shape. FIGURE 11 is purely diagrammatic and is merely given by way of explanation.

Furthermore, the lights shown in the circuits of FIGURES 6 and 7, which are supplied by an E.M.F. between + and − can be replaced by lamps of the rare gas discharge tube type, such as neon lamps, etc. In this case only a single current input will suffice.

Although the present invention has been described in conjunction with preferred embodiments, it is to be understood that modifications and variations may be resorted to without departing from the spirit and scope of the invention, as those skilled in the art will readily understand.

Such modifications and variations are considered to be within the purview and scope of the invention and appended claims.

I claim:

1. A device for the justification of a line of print composed on a conventional type-setting keyboard of the type wherein any one key actuates a corresponding escapement device through a conventional mechanism during a period of time of between three milliseconds and one thirtieth of a second and preferably of one one-hundredth of a second comprising a plurality of keys on the keyboard including a character key and a space key, an escapement device actuated by each of said keys, an electric switch for each escapement device in an operative relationship with said escapement device, a primary source of direct electric current connected to each of said electric switches, an electric distribution network comprising at least six distribution lines, a plurality of unique electric circuits each connected at one extremity to at least one said electric switch and bearing at its other extremity means for connection to at least one of said at least six distribution lines in accordance with a selected code wherein each said electric circuit is unique, said means for connection including at least one electric rectifier, each of said at least six distribution lines being adapted to feed into at least one electrical binary circuit including a plurality of relay means, each said electrical binary circuit being adapted to receive data represented by an electrical signal originating from said primary source and being connected to at least one other said electrical binary circuit, said electrical binary circuits constituting a binary computer of the type wherein input data is transformed into a modulus represented by a power of two and successive stages in said computer represent successive positive integer powers of two, a first series of indicator means and a second series of indicator means selectively controlled by said computer, said first series of indicator means indicating by progression in a given direction a function of the summation of a plurality of given parameters each corresponding to the operation of said character key operated on the keyboard, said second series of indictor means indicating by progression in a direction opposite to said given direction of said first series of indicator means a function of the summation of a sequence of parameters each corresponding to differences between maximum and minimum of limits of spacing for each operation of said space key of the keyboard, a means for detecting the cross-over through a plane transverse to the paths of progression of said first and said second series of indicator means, and an actuator-timer adapted to prepare said binary computer for receiving data, whereby actuation of any said key closes said electric switch operatively connected with said escapement device corresponding to said key, sends current from said primary source through said unique circuit connected to said electric switch into selected distribution lines, said selected distribution lines sending said current both to said actuator-timer and to said binary circuits corresponding to said selected distribution lines where it is delayed, said actuator-timer preparing said binary computer and said binary computer receiving data signals corresponding to said delayed current, which data signals are thereafter computed, the result of such computation being registered by said series of indicator means.

2. A device according to claim 1 in which said actuator-timer comprises a plurality of electric circuit means including a plurality of relay means, a plurality of secondary sources of direct electric current and a plurality of electromagnetic switch means adapted to selectively connect said secondary sources of direct electric current with selected relay means in each said plurality of electrical binary circuits forming said binary computer for cycles including preselected periods of time, each said cycle being initiated by electric energization of at least any one of said at least six distribution lines.

3. A device according to claim 2 in which said electrical signal originating from said primary source is adapted to energize at least one of said plurality of electromagnetic switch means in said actuator-timer.

4. A device for the justification of a line of print composed on a conventional type-setting keyboard of the type wherein any one key actuates a corresponding escapement device through a conventional mechanism during a period of time of between three milliseconds and one thirtieth of a second and preferably of one one-hundredth of a second comprising a plurality of keys on the keyboard including a character key and a space key,
an escapement device actuated by each of said keys,
an electric switch for each escapement device in an operative relationship with said escapement device,
a primary source of direct electric current connected to each of said electric switches,
an electric distribution network comprising at least six distribution lines,
a plurality of unique electric circuits each connected at one extremity to at least one said electric switch and bearing at its other extremity means for connection to at least one of said at least six distribution lines in accordance with a selected code wherein each said electric circuit is unique,
said means for connection including at least one electric rectifier,
each of said at least six distribution lines being adapted to feed into at least one electrical binary circuit including a plurality of relay means,
each said electrical binary circuit being adapted to receive data represented by an electrical signal originating from said primary source and being connected to at least one other said electrical binary circuit,
a first series of said electrical binary circuits interconnected to form a first binary computer,
a second series of said electrical binary circuits interconnected to form a second binary computer,
said first and second binary computers being of the type wherein input data is transformed into a modulus represented by a power of two and successive stages in each of said computers represent successive positive integer powers of two,
a first series of indicator means selectively controlled by said first computer,
a second series of indicator means selectively controlled by said second computer,
said first series of indicator means indicating by progression in a given direction a function of the summation of a plurality of given parameters each corresponding to the operation of said character key operated on the keyboard,
said second series of indicator means indicating by progression in a direction opposite to said given direction of said first series of indicator means a function of the summation of a sequence of parameters each corresponding to differences between maximum and minimum of limits of spacing for each operation of said space key of the keyboard,
a means for detecting the cross-over through a plane transverse to the paths of progression of said first and said second series of indicator means,
and an actuator-timer adapted to prepare said first binary computer for receiving data,
whereby actuation of a selected key causes corresponding data signals to be fed into said second computer, actuation of another selected key causes corresponding data signals to be fed into said second computer, said first series of indicator means registering the computation by said first computer and said second series of indicator means registering the result of computation by said second computer.

5. A device according to claim 4 in which said second computer is adapted to be electrically connected to said primary source by means of at least one selected said electric switch.

6. A device according to claim 4 in which said first and second series of indicator means each comprise a plurality of spaced light sources adapted to emit light sequentially when energized by control signals from said first and second computers.

7. A device according to claim 6 in which for each said light source in said first series there is provided a first electric circuit and for each said light source in said second series there is provided a second electric circuit, said first and second electric circuits being adapted to be electrically connected to at least one end-of-line indicator, said end-of-line indicator being adapted to indicate when said function of the summation of parameters corresponding to said character keys and said function of the summation of a sequence of fixed parameters each corresponding to said space key when computed, correspond to a function which represents the completion of a line of type.

8. A device according to claim 7 in which each said first electric circuit comprises at least one electrical relay means adapted to be energized upon energization of said light source corresponding thereto, and each said second electric circuit comprises at least one electrical relay means adapted to be energized upon energization of said light source corresponding thereto; between each of said at least one relay means of said first electric circuit and each of said at least one relay means of said second electric circuit, a line adapted to be electrically energized only upon energization of all of its corresponding relay means, said electrical energization of said line being adapted to operate said end-of-line indicator.

9. A device for the justification of a line of print composed on a conventional type-setting keyboard of the type wherein any one key actuates a corresponding escapement device through a conventional mechanism during a period of time of between three milliseconds and one thirtieth of a second and preferably of one one-hundredth of a second comprising a plurality of keys on the keyboard including a character key and a space key,
an escapement device actuated by each of said keys,
an electric switch for each escapement device in an operative relationship with said escapement device,
a primary source of direct electric current connected to each of said electric switches,
an electric distribution network comprising at least six distribution lines,
a plurality of unique electric circuits each connected at one extremity to at least one said electric switch and bearing at its other extremity means for connection to at least one of said at least six distribution lines in accordance with a selected code wherein each said electric circuit is unique,
said means for connection including at least one electric rectifier,
each of said at least six distribution lines being adapted to feed into at least one electrical binary circuit including a plurality of relay means,
each said electrical binary circuit being adapted to receive data represented by an electrical signal originating from said primary source and being connected to at least one other said electrical binary circuit,
said electrical binary circuits constituting a binary computer of the type wherein input data is transformed into a modulus represented by a power of two and successive stages in said computer represent successive positive integer powers of two,
said first series of indicator means indicating by progression in a given direction a function of the summation of a plurality of given parameters each corresponding to the operation of said character key operated on the keyboard, said second series of indicator means located adjacent and parallel to said first indicator means to indicate in a direction directly parallel and opposite to said given direction of said first series of indicator means and corresponding to a function of the summation of a sequence of parameters each corresponding to differences between maximum and minimum of limits of spacing for each operation of said space key of the keyboard, whereby an end-of-line indication is obtained by visual indication of the crossover through a plane transverse to the paths of progression of said first and said second series of indicator means, and an actuator-timer adapted to prepare said binary computer for receiving data.

10. A device in accordance with claim 9 wherein said first series of indicator means is mounted on a first scale, and a second series of indicator means is mounted on a second scale located adjacent and parallel to said first scale.

References Cited in the file of this patent
UNITED STATES PATENTS 2,679,975     Grosvalet et al.            June 1, 1954

OTHER REFERENCES

Weik: BRL Report No. 1010, June 1957, A Second Survey of Domestic Electronic Digital Computing Systems, pages 208 and 209 relied on.